(No Model.) 2 Sheets—Sheet 1.

R. P. ELLIOTT.
MIRROR SUPPORTING DEVICE.

No. 426,785. Patented Apr. 29, 1890.

WITNESSES:

INVENTOR:

(No Model.) 2 Sheets—Sheet 2.

R. P. ELLIOTT.
MIRROR SUPPORTING DEVICE.

No. 426,785. Patented Apr. 29, 1890.

WITNESSES: INVENTOR:

UNITED STATES PATENT OFFICE.

RICHARD P. ELLIOTT, OF SOMERVILLE, ASSIGNOR TO CHARLES H. FRENCH, OF NASHUA, AND DAVID HEALD, OF MILFORD, MASSACHUSETTS.

MIRROR-SUPPORTING DEVICE.

SPECIFICATION forming part of Letters Patent No. 426,785, dated April 29, 1890.

Application filed May 25, 1889. Serial No. 312,061. (No model.)

*To all whom it may concern:*

Be it known that I, RICHARD P. ELLIOTT, of Somerville, in the county of Middlesex and State of Massachusetts, have invented certain new and useful Improvements in Mirror Supporting and Adjusting Devices, of which the following is a specification.

This invention relates to toilet-mirrors which are supported either by articles of furniture like bureaus or by independent supports; and it has for its object to provide improved means whereby a mirror may be moved bodily from and toward the support which sustains it, and can be inclined at various angles while standing at any point to which it may be bodily moved.

The invention consists in two jointed arms hinged at their inner ends to fixed supports, so as to be capable of swinging horizontally, and connected at their outer ends to the mirror-frame by horizontal pivots, so that the mirror can either stand vertically or at any desired angle from a vertical position, the jointed arms affording a support whereby the mirror can be moved outwardly from the support to any desired extent and caused to stand either parallel with the wall behind it or with either edge thrown forward, all of which I will now proceed to describe.

Figure 1:
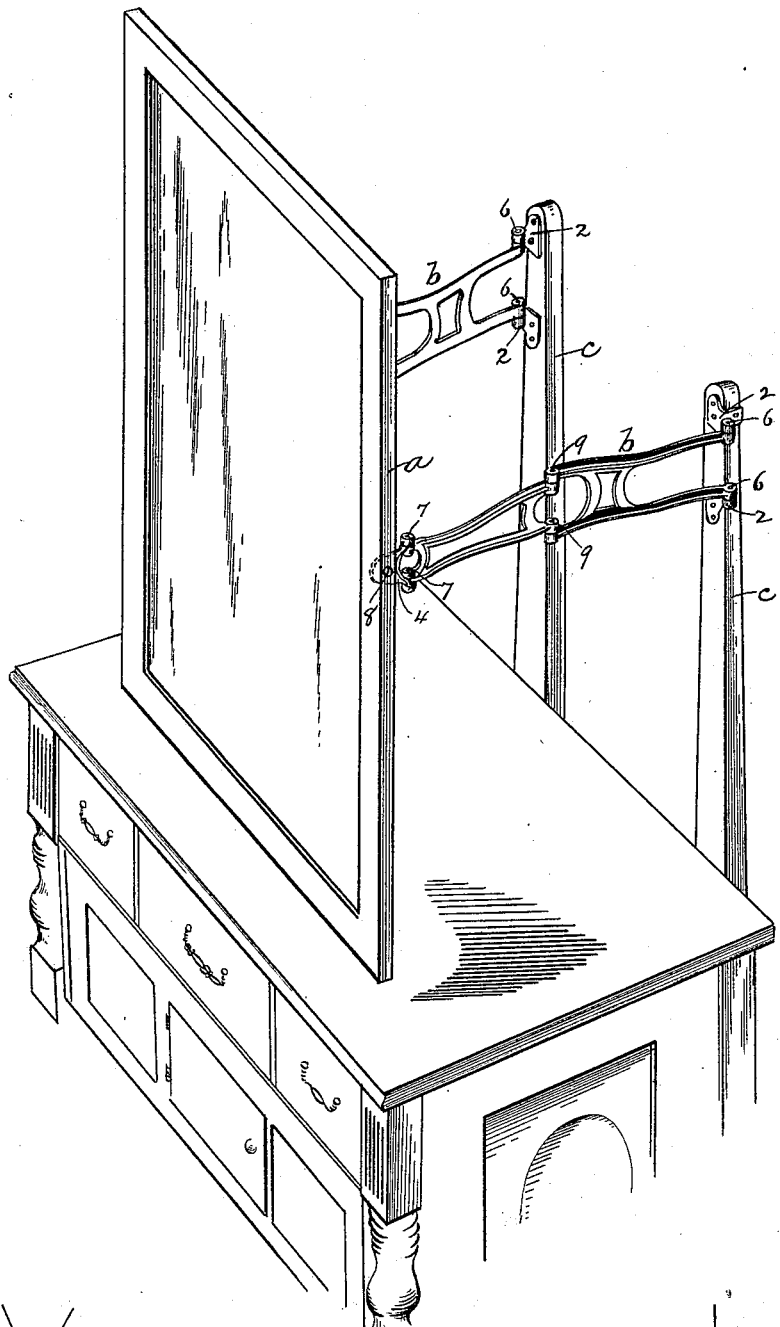
Figure 2:
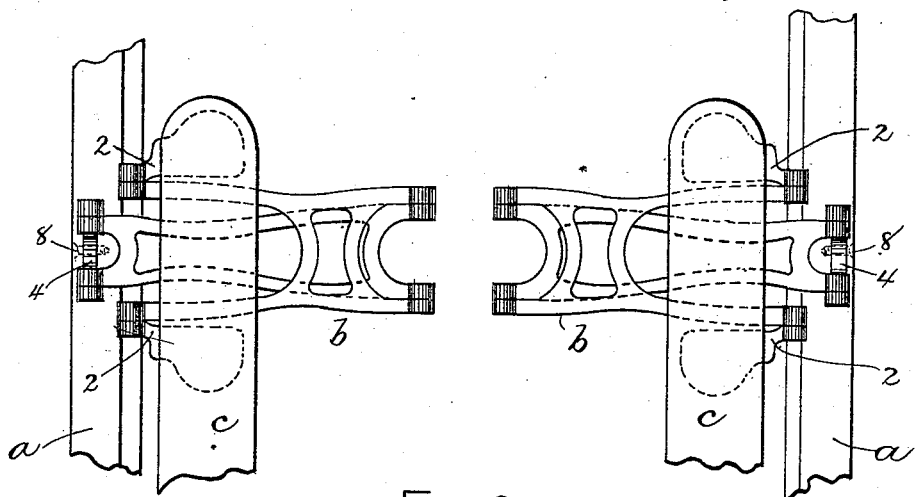
Figure 3:
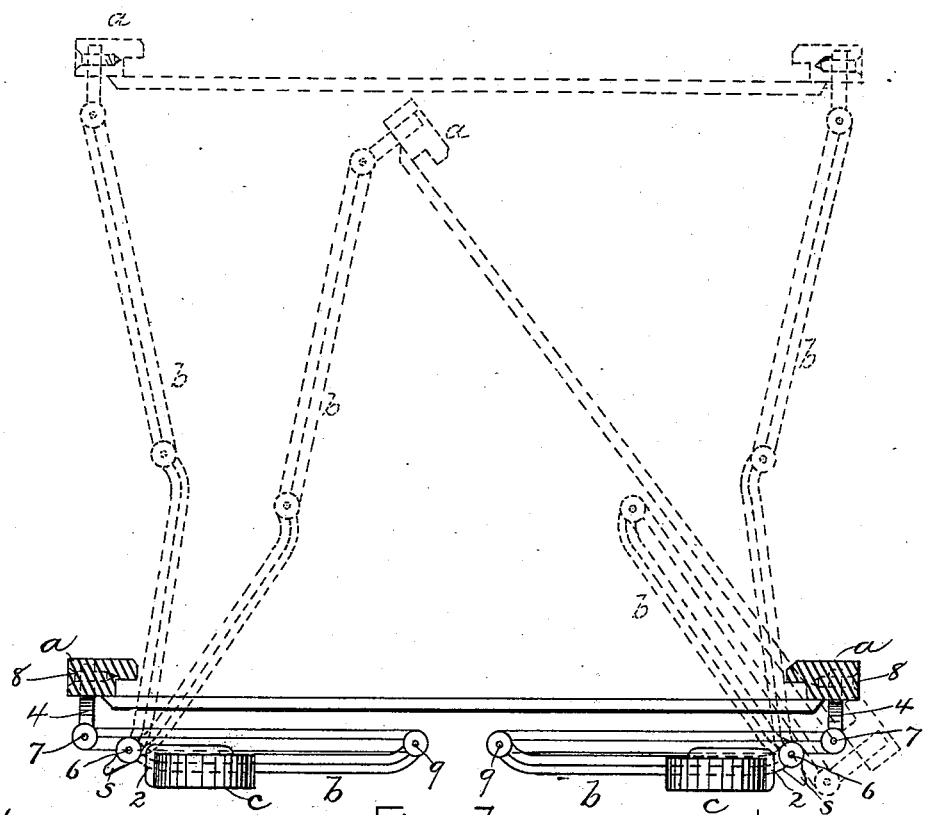

Of the accompanying drawings, forming a part of this specification, Figure 1 represents a perspective view of a mirror connected to supports on a bureau by my improved devices. Fig. 2 represents a rear view of the supports, connecting devices, and a part of the mirror. Fig. 3 represents a top view of the same.

The same letters and numerals of reference indicate the same parts in all the figures.

In the drawings, $a$ represents a mirror-frame, and $b$ $b$ represent the two jointed arms which connect the same to a support or supports, the mirror being here shown as connected by the arms $b$ $b$ with two standards $c$ $c$, affixed to the back of a bureau and projecting upwardly therefrom. If desired, however, the standards $c$ $c$ may be the vertical parts of a frame, formed to inclose the mirror when the latter is pushed back. The arms $b$ $b$ are connected at their inner ends by vertical pivots 6 with brackets or hinge members 2 2, affixed to the supports $c$ $c$, the connection being such that the arms can swing horizontally on centers or pivots 6 at their inner ends. The outer ends of the arms are connected by vertical pivots 7 to ears 4, which are connected by horizontal pivots 8 with the mirror-frame, the connection of the frame to said ears being such that the said frame can swing as on a horizontal axis on said ears, and can assume a vertical position or can be inclined at any desired angle from a vertical position.

Each arm is composed of two members or parts which are connected by a central vertical pivot 9, so that each of the said members can be turned horizontally independently of the other, and can assume any angle with relation to the other and with relation to the mirror-frame, the pivotal connection of the outer ends of the arms with the ears 4 enabling the outer sections of the arms to stand at various angles with the back of the mirror.

The arms $b$ $b$ are located at the same height, one arm being connected by an ear 4 with one of the vertical pieces of the mirror-frame, while the other arm is connected by the other ear 4 with the other vertical piece of the mirror-frame at the opposite edge of the mirror, this arrangement of the arms, together with the pivotal connection of the ears 4 with the outer ends of the arms, enabling the mirror to assume all the different positions above indicated.

The ears 4 may be termed the "outer sections" of the arms, each arm being composed of three sections or members, and having two joints—viz., the pivots 7 and 9—besides the pivots that connect their ends, respectively, to the supports $c$ and mirror $a$.

The described construction gives the mirror a wide range of adjustment and enables it to stand in many different positions. When the mirror is moved back to its farthest extent, the arms are folded behind the mirror, as shown in full lines in Fig. 3, so that they occupy but little room.

It will be seen that the supports $c$ $c$ may be placed so near each other that they will be entirely concealed by the mirror when the latter is pushed back. By making the supports in this way the expense of a frame surrounding the mirror is avoided, the construction is simplified, and the weight reduced.

It is desirable to limit the outward swinging movement of the inner sections or members of the arms $b$ by stops $s\ s$, formed on the inner ends of said sections, so that said sections in swinging outwardly cannot reach a position at right angles with the back of the bureau, but will stand when swung outwardly at an angle of about eighty degrees or less than ninety degrees with said back. The object of this is, first, to prevent the arms from swinging so freely as to enable the mirror to be moved bodily back against the wall outside of the supports $c\ c$, and, secondly, to keep the sections of the arms in such position when the mirror is drawn outwardly that when inward pressure is applied to the mirror the arms will fold behind the mirror as the latter is moved inwardly.

It will be seen that the jointed arms are movable only in a horizontal plane and are not movable vertically; hence the mirror supported thereby is movable only in a horizontal plane by the action of said arms, and therefore does not rise and fall in moving in and out and remains in any position to which it may be adjusted by the movement of said arms, no springs or other contrivances being required to retain it in position.

I am aware that a mirror has been supported by a single-jointed arm which is movable horizontally but not vertically; but it will be observed that the use of two arms connected at opposite sides of the mirror-frame confer the following advantages over a single arm, viz: first, they support the mirror equally at opposite sides, preventing racking strain on any part of the frame, and, secondly, one arm checks the swinging movement of the mirror in one direction and the other in the opposite direction, so that the mirror cannot swing indefinitely.

I claim—

1. A pair of jointed arms, each composed of two members connected at their meeting ends by a vertical pivot, and an ear connected to the outer end by a vertical pivot, combined with a mirror-frame, the sides of which are connected with said ears by horizontal pivots, and supports to which the inner ends of said arms are connected by vertical pivots, said arms constituting independent horizontally-movable but vertically-immovable connections between the said supports and the vertical sides of the mirror-frame, whereby movement of the mirror in any direction in a horizontal plane is permitted, each arm supporting one edge of the mirror, as set forth.

2. The combination of a bureau having mirror-supports at its back, jointed arms pivotally secured at their inner ends to said supports, and a mirror pivotally secured to the outer ends of said arms, and adapted by the latter to be moved bodily in a horizontal plane toward and from the supports, the distance between said supports being less than the width of the mirror-frame, whereby the supports are concealed by the mirror-frame when the same is moved back.

3. The combination of a mirror, two independent horizontally-movable but vertically-immovable jointed arms pivotally connected at their outer ends to the mirror-frame, supports to which the inner ends of said arms are pivotally connected, and two stops, one at the inner end of each arm, whereby the outward swinging movement of the inner sections or members of said arms is limited, one of said stops limiting the horizontal movement of the mirror in one direction and the other in the opposite direction.

In testimony whereof I have signed my name to this specification, in the presence of two subscribing witnesses, this 20th day of May, A. D. 1889.

RICHARD P. ELLIOTT.

Witnesses:
 C. F. BROWN,
 A. D. HARRISON.